United States Patent
Letocha et al.

(10) Patent No.: US 10,049,478 B2
(45) Date of Patent: *Aug. 14, 2018

(54) RETRIEVAL AND DISPLAY OF VISUAL OBJECTS

(71) Applicant: Quadient Group AG, Appenzell (CH)

(72) Inventors: Boris Letocha, Hradec Kralove (CZ); Jan Knoulich, Hradec Kralove (CZ)

(73) Assignee: Quadient Group AG, Appenzell (CH)

( * ) Notice: Subject to any disclaimer, the term of this patent is extended or adjusted under 35 U.S.C. 154(b) by 454 days.

This patent is subject to a terminal disclaimer.

(21) Appl. No.: 14/920,162

(22) Filed: Oct. 22, 2015

(65) Prior Publication Data

US 2016/0042546 A1 Feb. 11, 2016

Related U.S. Application Data

(63) Continuation-in-part of application No. 13/047,650, filed on Mar. 14, 2011, now Pat. No. 9,189,460.

(30) Foreign Application Priority Data

Mar. 15, 2010 (CH) ........................... 358/10

(51) Int. Cl.
*G06T 11/60* (2006.01)
*H04W 24/10* (2009.01)
(Continued)

(52) U.S. Cl.
CPC ............ *G06T 11/60* (2013.01); *G06F 17/214* (2013.01); *H04W 24/10* (2013.01); *H04W 72/085* (2013.01); *G06F 9/451* (2018.02)

(58) Field of Classification Search
CPC ....... G06T 11/60; H04W 72/085; H04W 24/10
(Continued)

(56) References Cited

U.S. PATENT DOCUMENTS 5,185,818 A 2/1993 Warnock
5,500,931 A 3/1996 Sonnenschein
(Continued)

FOREIGN PATENT DOCUMENTS

WO WO 2000/038170 A2 6/2000

OTHER PUBLICATIONS

Extended European Search Report dated May 23, 2011, for European Appl. No. 11001927.0-1527.

*Primary Examiner* — Daeho D Song
(74) *Attorney, Agent, or Firm* — Knobbe, Martens, Olson & Bear, LLP

(57) ABSTRACT

For generating one or more two-dimensional visual objects, an initial visual representation is determined (S2) and shown (S3) in a display area of a communication terminal (1). A data representation of the visual objects is transmitted (S5) from the communication terminal (1) to a remote processing center (3). The communication terminal (1) receives (S7) from the processing center (3) an enhanced visual representation of the visual objects, and replaces (S9) in the display area the initial representation with the enhanced representation. Retrieving (SE) an enhanced representation from the processing center (3), makes it possible to display visual objects on the communication terminal (1) in representations which are not supported by the communication terminal (1), e.g. graphical objects can be rendered according to enhanced algorithms and/or characters can be rendered in enhanced fonts not supported by the communication terminal (1).

18 Claims, 7 Drawing Sheets

(51) Int. Cl.
  *H04W 72/08* (2009.01)
  *G06F 17/21* (2006.01)
  *G06F 9/451* (2018.01)

(58) Field of Classification Search
  USPC .......................................................... 715/744
  See application file for complete search history.

(56) References Cited

U.S. PATENT DOCUMENTS

| | | | |
|---|---|---|---|
| 5,533,174 A | 7/1996 | Flowers et al. | |
| 5,586,242 A | 12/1996 | McQueen et al. | |
| 5,689,724 A | 11/1997 | Morgan et al. | |
| 5,859,648 A | 1/1999 | Moore et al. | |
| 5,869,648 A | 2/1999 | Ludescher et al. | |
| 5,990,907 A | 11/1999 | Colletti | |
| 6,038,575 A | 3/2000 | Jensen et al. | |
| 6,043,826 A | 3/2000 | Manning | |
| 6,073,147 A | 6/2000 | Chan et al. | |
| 6,073,148 A | 6/2000 | Rowe et al. | |
| 6,421,055 B1 | 7/2002 | Jones et al. | |
| 6,490,547 B1 | 12/2002 | Atkin et al. | |
| 6,512,448 B1 | 1/2003 | Rincon et al. | |
| 6,601,108 B1 | 7/2003 | Marmor | |
| 6,603,478 B1 * | 8/2003 | Kuo .................. G06F 3/018 345/467 | |
| 6,678,410 B1 | 1/2004 | Phinney et al. | |
| 7,246,324 B2 * | 7/2007 | Mikhail ............. G06F 9/542 707/E17.117 | |
| 7,275,212 B2 * | 9/2007 | Leichtling .......... G06F 3/1454 345/629 | |
| 7,373,422 B1 * | 5/2008 | Paul .................. H04L 67/303 709/227 | |
| 7,403,888 B1 | 7/2008 | Wang et al. | |
| 7,471,960 B2 * | 12/2008 | Kwon ............... H04M 1/72527 455/414.1 | |
| 7,480,867 B1 * | 1/2009 | Racine ................. G06Q 10/08 715/744 | |
| 7,562,314 B2 * | 7/2009 | Blount ............... G06F 3/04883 345/173 | |
| 7,584,090 B1 | 9/2009 | Kalra | |
| 7,721,222 B1 * | 5/2010 | Shaik .................. G06F 3/018 345/156 | |
| 7,937,658 B1 | 5/2011 | Lunde | |
| 8,379,027 B2 * | 2/2013 | Lim ..................... G06T 11/203 345/467 | |
| 8,381,115 B2 * | 2/2013 | Tranchant ............ G09G 5/225 705/50 | |
| 8,484,564 B1 * | 7/2013 | Marti ................... G06Q 50/01 463/42 | |
| 8,552,987 B2 * | 10/2013 | Kuroume ........... G06F 3/04886 345/173 | |
| 8,769,405 B2 * | 7/2014 | Bacus ................. G06F 17/214 715/234 | |
| 2001/0051007 A1 * | 12/2001 | Teshima ............... G06T 3/4092 382/305 | |
| 2002/0083119 A1 * | 6/2002 | Matsui ................. G06Q 10/025 709/200 | |
| 2002/0194261 A1 | 12/2002 | Teshima | |
| 2003/0046314 A1 | 3/2003 | Morooka | |
| 2004/0039996 A1 | 2/2004 | Flam | |
| 2004/0109020 A1 | 6/2004 | Song | |
| 2004/0126017 A1 * | 7/2004 | Seni ..................... G06K 9/2054 382/229 | |
| 2004/0139235 A1 * | 7/2004 | Rashid .................... H04L 29/06 709/248 | |
| 2004/0148436 A1 * | 7/2004 | Notsu ................. G06K 9/00973 709/246 | |
| 2004/0177056 A1 | 9/2004 | Davis et al. | |
| 2005/0114036 A1 * | 5/2005 | Fruhling ................ G16H 10/40 702/19 | |
| 2005/0275656 A1 | 12/2005 | Corbin et al. | |
| 2006/0095844 A1 * | 5/2006 | Van Leeuwen ....... G06F 3/0236 715/700 | |
| 2006/0164420 A1 * | 7/2006 | Cheng .................. G06F 17/211 345/467 | |
| 2006/0170685 A1 | 8/2006 | Wilson Brown | |
| 2006/0232588 A1 | 10/2006 | Opstad et al. | |
| 2007/0006076 A1 | 1/2007 | Cheng | |
| 2007/0024626 A1 | 2/2007 | Kagle et al. | |
| 2007/0055934 A1 | 3/2007 | Adamson, III | |
| 2007/0154094 A1 * | 7/2007 | Lin ..................... G06K 9/00416 382/187 | |
| 2007/0178918 A1 * | 8/2007 | Shon ................. H04M 1/72552 455/466 | |
| 2007/0182595 A1 * | 8/2007 | Ghasabian ............ G06F 1/1615 341/22 | |
| 2007/0283047 A1 | 12/2007 | Theis et al. | |
| 2008/0070730 A1 | 3/2008 | Nelson et al. | |
| 2008/0079730 A1 * | 4/2008 | Zhang .................. G06F 17/214 345/468 | |
| 2008/0120541 A1 * | 5/2008 | Cheng ................. G06F 17/2217 715/269 | |
| 2008/0154911 A1 | 6/2008 | Cheng | |
| 2008/0215347 A1 * | 9/2008 | Suzuki ............... G06F 3/04817 705/1.1 | |
| 2008/0235578 A1 | 9/2008 | Heed et al. | |
| 2008/0262830 A1 | 10/2008 | Flam | |
| 2008/0303822 A1 | 12/2008 | Taylor et al. | |
| 2008/0306916 A1 | 12/2008 | Gonzalez et al. | |
| 2009/0031220 A1 | 1/2009 | Tranchant et al. | |
| 2009/0109227 A1 | 4/2009 | Leroy | |
| 2009/0233632 A1 * | 9/2009 | Yamamoto ............ H04L 51/063 455/466 | |
| 2010/0070896 A1 * | 3/2010 | Attinger ................. G06F 17/212 715/765 | |
| 2010/0115454 A1 * | 5/2010 | Tuli ..................... H04L 67/2861 715/780 | |
| 2010/0231598 A1 | 9/2010 | Hernandez et al. | |
| 2011/0093565 A1 | 4/2011 | Bacus et al. | |
| 2011/0115797 A1 * | 5/2011 | Kaplan ................. G06T 11/203 345/467 | |
| 2011/0155797 A1 | 6/2011 | Hallam | |
| 2012/0084310 A1 * | 4/2012 | Lieb .................. G06F 17/30867 707/766 | |
| 2012/0259756 A1 * | 10/2012 | Ravisankar ............ G06Q 40/04 705/37 | |

* cited by examiner

He ←L1
Hel ←L2
Hell ←L3
Hello ←L4
Hello ←L5
Hello ←L6
Hello w ←L7
Hello wo ←L8
Hello wor ←L9
Hello worl ←L10
Hello world ←L11
L12
Hello world

Fig. 6

RETRIEVAL AND DISPLAY OF VISUAL OBJECTS

RELATED APPLICATIONS

This application is a continuation-in-part of U.S. application Ser. No. 13/047,650, filed Mar. 14, 2011, which claims the benefit of priority from Swiss Patent Application No. 00358/10, filed Mar. 15, 2010. The disclosures of the aforesaid applications are hereby incorporated herein by reference

BACKGROUND OF THE INVENTION

Field of the Invention

The present invention relates to a method and devices for generating two-dimensional visual objects. Specifically, the present invention relates to a processing center, a communication terminal, and a method of generating in the communication terminal two-dimensional visual objects, e.g. graphical objects or characters.

Description of the Related Art

With the increased significance of online media, it has also become more and more important to implement features customary in print media. Particularly, for purposes of corporate identity it has been common practice to ensure that a company's visual appearance is consistent and uniform. For that purpose, many companies have designed their own fonts which are typically protected under intellectual property laws and may only be used by a third party with explicit permission and/or license by the proprietor. However, it is not practical to provide any and all communication terminals and/or software applications such as browsers installed on these communication terminals with permissions and/or licenses to use any and all of the company's proprietary fonts or other visual objects. Furthermore, it is typically not desirable to use the resources of a communication terminal, particularly those of a mobile communication terminal, for storing a great number of different fonts that may never be used. Thus, while in printed media a company may efficiently control the use of its own fonts, in online media this is much more difficult, if access to the company's online information is not to be restricted unnecessarily.

US2007/0024626 describes a system and a method for handling large character sets for languages such as Chinese, Japanese or Korean, in devices with memories too small to store the complete character set. According to US2007/0024626, only a portion of the character set is stored in the device. When a character is required that is not stored in the device, a placeholder character such as a space, a dot or a square, is displayed instead, and the missing character is requested from a server where the complete character set is stored. Upon receipt of the missing character from the server, the displayed placeholder character is replaced with the correct character.

SUMMARY

It is an object of this invention to provide a method and devices for generating two-dimensional visual objects, e.g. graphical objects or characters, in a communication terminal, particularly in a browser which runs on a communication terminal.

According to the present invention, at least some of these objects are achieved particularly through the features of the independent claims. In addition, further advantageous embodiments follow from the dependent claims and the description.

According to the present invention, the above-mentioned objects are particularly achieved in that, for generating two-dimensional visual objects in a communication terminal, e.g. in a browser which runs on the communication terminal, a data entry defining the visual objects is received in the communication terminal. For example, the data entry corresponds to one or more graphical objects or one or more characters. In the communication terminal, a first visual representation of the visual objects is determined based on the data entry. For example, the first visual representation of the graphical objects is based on an algorithm supported in the communication terminal, or the first visual representation of the characters is a selection, with a one-to-one correspondence to the data entry, from a set of character representation types, e.g. bitmap fonts or outline fonts (i.e. vector fonts), supported in the communication terminal, respectively. Determining the first visual representation of the characters with a one-to-one correspondence to the data entry ensures that the first visual representation unambiguously reflects the data entry, i.e. the entered characters. The first visual representation of the visual objects is shown on a display, e.g. in a display area of the browser. A data representation of the visual objects is transmitted from the communication terminal via a telecommunications network to a processing center. For example, the data representation of the visual objects includes codes of one or more characters, or vectors or other numerical representations of one or more graphical objects. In the processing center, a second visual representation of the visual objects is determined, based on the data representation of the visual objects. The second visual representation of the visual objects is different from the first visual representation of the visual objects. For example, the second visual representation of the graphical objects is based on an algorithm supported in the processing center, or the second visual representation of the characters is a selection from a set of character representation types supported in the processing center, respectively. The second visual representation of the visual objects is transmitted from the processing center via the telecommunications network to the communication terminal. The second visual representation of the visual objects is received in the communication terminal via the telecommunications network from the processing center. In the display area, the first visual representation of the visual objects is replaced with the second visual representation of the visual objects. For example, the first visual representation of the graphical objects or characters is overwritten in the display area with the second visual representation of the graphical objects or characters, respectively. For example, the first and/or second visual representations of the characters are bitmap fonts or outline fonts (i.e. vector fonts).

Retrieving a different, second visual representation of the visual objects from the processing center, and overwriting the first visual representation of the visual objects with this second visual representation make it possible to replace graphical objects which are based on an algorithm locally supported by the communication terminal or browser, respectively, with graphical objects which are based on an algorithm supported by the remote processing center, and/or to replace characters which are selected with a one-to-one correspondence to the data entry from a set of character representation types, i.e. terminal fonts, supported locally in the communication terminal or browser, respectively, with characters selected from a set of character representation types, i.e. server fonts, supported in the remote processing center. Thus, it is possible to display on the communication terminal visual representations of visual objects which are not locally supported on the communication terminal or the browser, respectively, for reasons of resource conservation or licensing issues, for example. Specifically, it is possible to render on the display of the communication terminal characters not only with corresponding characters of a terminal font supported and stored locally by the communication terminal or browser, respectively, but with corresponding characters of a server font which is stored and provided by the remote processing center and is different from the terminal font.

In a preferred embodiment, character metrics data is transmitted from the processing center via the telecommunications network to the communication terminal. The communication terminal receives the character metrics data and sets in the display area a cursor based on the character metrics data received from the processing center. Providing character metrics data such as the width and height of one or more characters or the cursor distance from an anchor point of the first visual representation makes it possible to control and position in the communication terminal the location of the cursor for enhanced visual representations of characters which are not locally supported in the communication terminal or browser, respectively.

In a further embodiment, character metrics data for the second visual representation of the characters is received in the communication terminal from the processing center via the telecommunications network, and the first visual representation of the characters is shown in the display of the communication terminal while applying the received character metrics data for the second visual representation of the characters. Thus, the first visual representation of the characters is presented to the user of the communication terminal with the inter-character spacing of the second visual representation of the characters so that there is no sudden change in inter-character spacing, i.e. no character jumping, when the first visual representation of the characters, i.e. the terminal font, is replaced by the second visual representation of the characters, i.e. the server font.

In an embodiment, received in the communication terminal via the telecommunications network from the processing center is a set of second visual representations of visual objects which is associated with a target specification. For example, the set of second visual representations includes algorithms from the processing center for rendering the graphical objects, or the set of second visual representations includes a set or subset of character representation types, e.g. bitmap fonts or outline (i.e. vector) fonts of a particular alphabet or of a subset of that alphabet, supported in the processing center, respectively. The received set of second visual representations is stored in the communication terminal, and the visual objects are rendered in the display area with a visual representation from the set of second visual representations stored in the communication terminal. Thus, it is possible to display on the communication terminal visual objects which, initially, are not locally supported on the communication terminal or the browser, respectively, based on a set of enhanced visual representations provided by the processing center and stored in the communication terminal. Specifically, it is possible to render on the display of the communication terminal characters based on a set of server fonts which was previously retrieved from the remote processing center.

In a further embodiment, latency parameters are defined in the communication terminal, and the data representation of the visual object, e.g. one or more graphical objects or one or more characters, are transmitted from the communication terminal to the processing center according to the latency parameters. For example, the latency parameters are stored in the communication terminal and define a duration of time, a number of characters and/or a certain character or command after which the data representation of the visual object is transmitted from the communication terminal to the processing center for retrieving the enhanced second visual representation. Thus, the latency parameters make it possible to define a refresh rate for enhancing the first visual representation, e.g. the terminal font, with the second visual representation, e.g. the server font, and/or to avoid network data traffic to and from the remote processing center with every data entry by the user of the communication terminal.

In another embodiment, the processing center establishes a cache with second visual representations of visual objects, e.g. one or more graphical objects or one or more characters, by storing in the processing center data representations received from the communication terminal assigned to their respective second visual representation of the visual objects. Subsequently, the processing center relies on the cache when determining the second visual representation of the visual objects and transmitting the second visual representation of the visual objects to the communication terminal. Implementing and relying on a cache is particularly useful for sequences of characters which have typically a relatively high repetition rate, so that frequently used character sequences can be retrieved at the processing center from the cache without having to determine each time a visual representation with the server font, particularly, in an embodiment where determining the second visual representation involves generating an image (bitmap) of a graphical object or outline font.

In addition to a processing center, a communication terminal, and a method for generating two-dimensional visual objects, the present invention also relates to computer program products comprising computer program code means for controlling one or more processors of a processing center and/or a communication terminal, preferably a computer program product comprising a tangible computer-readable medium having stored therein the computer program code.

BRIEF DESCRIPTION OF THE DRAWINGS

The present invention will be explained in more detail, by way of example, with reference to the drawings in which:

FIG. 6 shows an example of a sequential data entry corresponding to characters which are shown in a first visual representation and, after a defined latency, in an enhanced second visual representation which is not supported locally in the communication terminal.

DETAILED DESCRIPTION OF THE PREFERRED EMBODIMENTS

Figure 1:
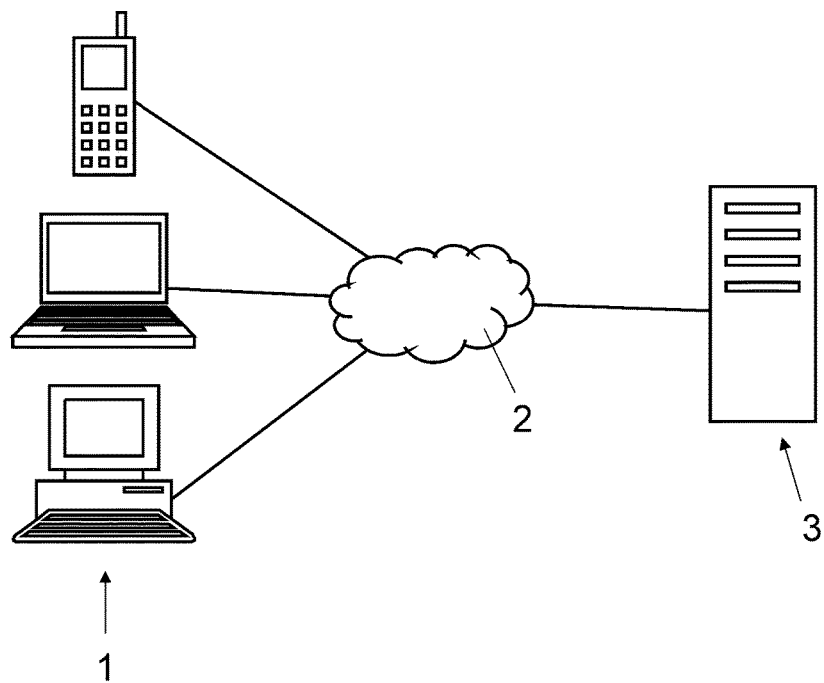
FIG. 1 shows a block diagram illustrating schematically communication terminals configured to interact via a telecommunications network with a remote processing center for generating enhanced representations of two-dimensional visual objects.
Figure 2:
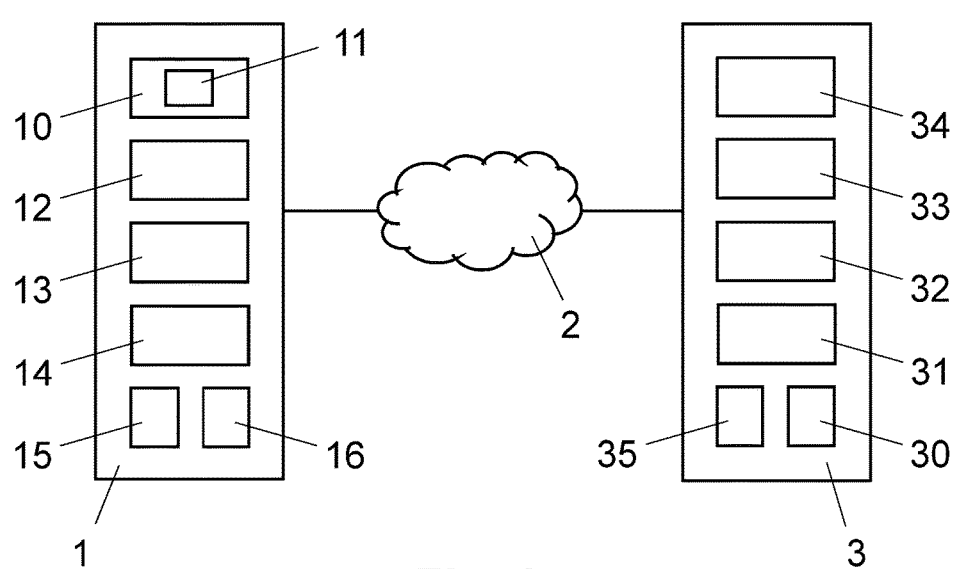
FIG. 2 shows a block diagram illustrating schematically a communication terminal with functional modules configured to interact via a telecommunications network with a remote processing center which includes further functional modules for generating enhanced representations of two-dimensional visual objects.
Figure 3:
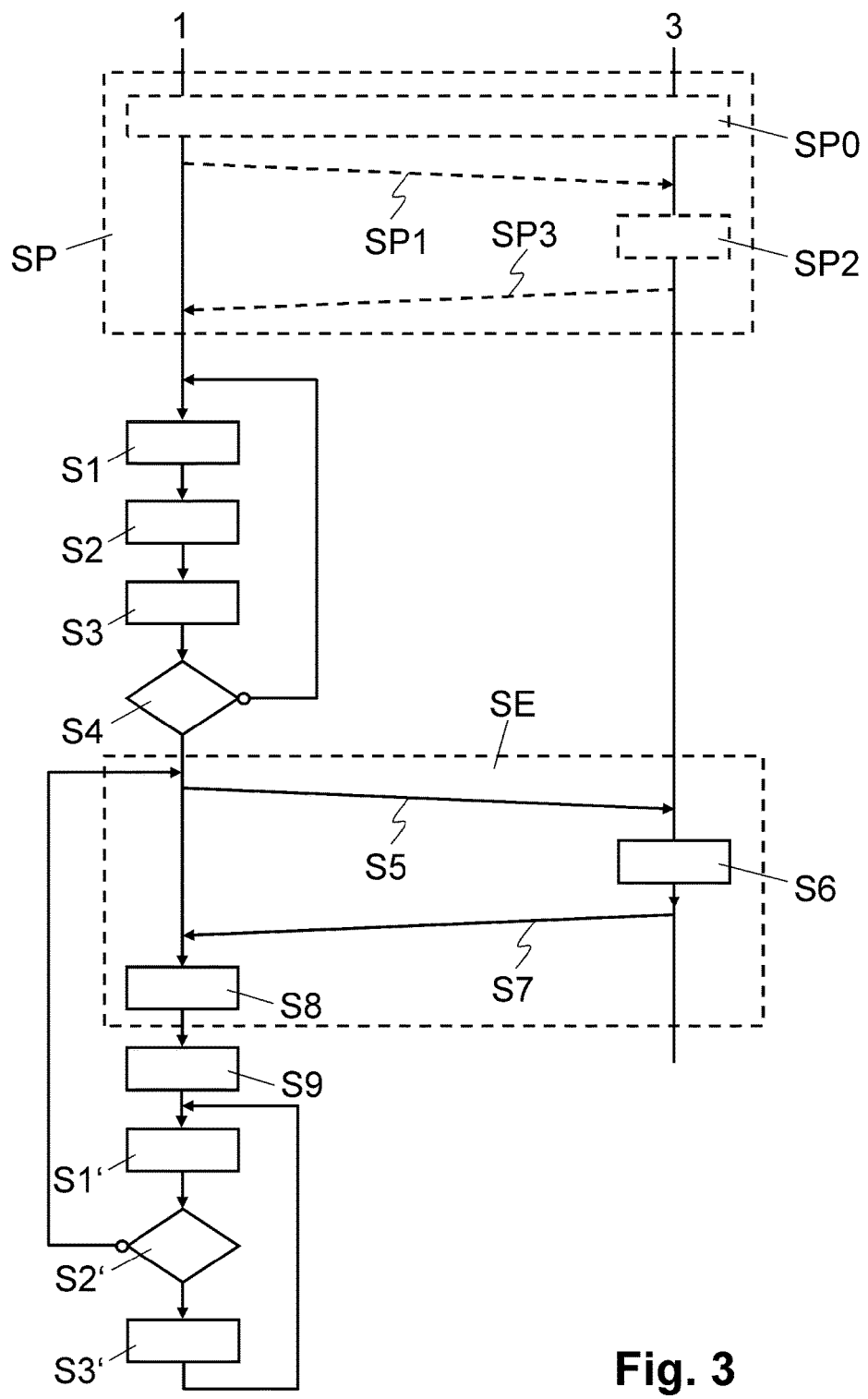
FIG. 3 shows a flow diagram illustrating schematically an exemplary sequence of steps performed at the communication terminal and the remote processing center for generating enhanced representations of two-dimensional visual objects.

In FIGS. 1, 2 and 3, reference numeral 1 refers to a communication terminal, and reference numeral 3 refers to a remote processing center 3. The remote processing center 3 comprises one or more operable computers, each having one or more processors. In an embodiment of cloud computing, the remote processing center 3 is implemented in a distributed fashion as a cloud of a plurality of computers which are added and removed dynamically to the processing center 3.

The communication terminal 1 includes or is implemented as a mobile radio telephone or a personal data assistant (PDA), notebook, laptop or fixed personal computer, for example.

The communication terminal 1 and the processing center 3 include each a communication module for exchanging data via the telecommunications network 2.

Preferably, the telecommunications network 2 includes the Internet accessible to the communication terminal 1 through fixed networks and/or wireless networks. For example, the telecommunications network 2 includes a local area network (LAN), an integrated services digital network (ISDN), a Public Switched Telephone Network (PSTN), a GSM-network (Global System for Mobile communication), an UMTS-network (Universal Mobile Telephone System) or another terrestrial or satellite-based mobile radio telephone system, and/or a wireless local area network (WLAN) for accessing the Internet.

As is illustrated in FIG. 2, the communication terminal 1 and the processing center 3 include various functional modules. Specifically, the communication terminal 1 includes a browser module 110, e.g. Internet Explorer® by Microsoft® Corp., Firefox® by the Mozilla Foundation®, or Safari® by Apple Computer®, Inc., a data entry module 12, a data representation module 13, and an enhancement module 14; the processing center 3 includes a receiver module 31, a transmitter module 32, a generator module 33, and a metrics determination module 34.

Preferably, the functional modules are implemented as programmed software modules comprising program code for controlling one or more processors of the communication terminal 1 or processing center 3, respectively. Preferably, the program code is stored on a tangible computer-readable medium which is connected fixed or removably with the communication terminal 1 or processing center 3, respectively. One skilled in the art will understand, however, that, in alternative embodiments, the functional modules can be implemented fully or partly by means of hardware modules.

As is illustrated schematically in FIG. 2, the communication terminal 1 further includes a set of stored terminal fonts 15, i.e. a set of character representation types, for rendering characters in a first visual representation, and the remote center 3 further includes a set of stored server fonts 30 for rendering characters in a second visual representation. Preferably, the terminal fonts 15 and the server fonts 30 comprise in each case complete fonts or character representation types, respectively, comprising in each case all the characters of the font or character representation type. Alternatively, the fonts or character representation types comprise at least defined subsets with a common set of characters supported/stored in the communication terminal 1 and the remote center 3, e.g. all alphanumerical characters. Consequently, there is no need for placeholder characters at the communication terminal 1 as any entered character can first be rendered in one-to-one correspondence with a local terminal font 15 and then be replaced with a server font 30 from the remote processing center 3, if necessary. Typically, the server fonts 30 are different from the terminal fonts 15 and not supported by the communication terminal 1. However, in a preferred embodiment, the communication terminal 1 further includes a local cache memory 16 for storing temporarily enhanced visual representations received from the processing center, e.g. received server algorithms for enhanced rendering of geometric objects, and/or received server fonts 30 for enhanced rendering of characters.

In the following paragraphs, described with reference to FIGS. 3-9 are possible sequences of steps performed by the functional modules for generating one or more two-dimensional visual objects to be rendered in a display 10 of the communication terminal 1, specifically in a display area 11, for example, in a display area 11 of an Internet browser which runs on the communication terminal 1.

In FIG. 3, the reference numeral SP refers to a block of optional steps SP0, SP1, SP2, SP3 which are performed for retrieving from the remote processing center 3 character metrics data of a specific server font 30 which is not provided in the communication terminal 1 or browser module, respectively, but is requested as a target font, e.g. by the user or a current application or session.

For a specific font, the character metrics data includes the measurement of one or more characters, e.g. the character width and/or height; the inter-character spacing, e.g. the distance between the start of a first character to the start of a subsequent second character, or the distance between the end of a first character to the start of a subsequent second character; and/or the cursor distance from an anchor point of one or more characters. The character metrics data may further include control rules which include data defining line and/or page breaks for a specific font, for example.

In an embodiment, the block SP of optional steps not only retrieves from the remote processing center character metrics data but also a set of enhanced visual representations of visual objects, e.g. enhanced graphical algorithms or character fonts defined by target specification, e.g. an identifier of a specific graphical algorithm or server font 30, and described later in more detail.

In an optional preparatory step SP0, determined is a server font 30 which is not provided in the communication terminal 1 but required or desired as a target font. Depending on the embodiment and/or application, the target or server font 30, respectively, is defined in the communication terminal 1, e.g. by the user or the browser module or by another software program running on the communication terminal 1, or it is defined in the processing center 3 or in another server computer, e.g. by an application, a service, or another computer program based on a current session or application context, between the communication terminal 1 and the processing center 3 or other server computer, respectively.

In the optional preparatory step SP1, the enhancement module 14 transmits to the remote processing center 3 via the telecommunications network 2 a request for character metrics data of the server font 30. Depending on the embodiment and/or application, the request for character metrics is an explicit request which includes an identifier of a specific server font 30, or an implicit request which defines a session or application context that enables the processing center 3 to determine a session or application specific server font 30. As indicated above, in an embodiment, a set of enhanced visual representations of visual objects is also requested.

The request for character metrics is received in the processing center 3, and in the optional preparatory step SP2, the metrics determination module 34 determines for the server font 30 identified by or derived from the request character metrics data assigned to the determined server font 30. As indicated above, in an embodiment, a set of enhanced visual representations of visual objects, e.g. algorithms for graphical objects or fonts for characters, is also determined.

In the optional preparatory step SP3, the character metrics data is transmitted in a response by the transmitter module 32 from the processing center 3 via the telecommunications network 2 to the communication terminal 1 where it is stored. As indicated above, in an embodiment, a set of enhanced visual representations of visual objects is also returned to the communication terminal 1 and stored in the local cache memory 16.

In step S1, the data entry module 12 receives from the user data entry instructions which define one or more two-dimensional visual objects, e.g. one or more graphical objects or one or more characters. The data entry instructions are entered by the user via data entry elements such as a keyboard, a computer mouse, a scroll wheel, a touch pad, and/or a touch sensitive screen, for example. The graphical objects include, for instance, geometric forms such as a line, a square, a rectangle, a triangle, a polygon, a circle, an ellipse, etc. In an embodiment, the user data entry defines two-dimensional visual objects or graphical objects, respectively, which include and/or constitute one or more tables for arranging data in rows and columns, the data including alphanumerical data, i.e. numbers and characters. For example, the tables are formed by graphical objects including squares, rectangles, and/or polygons. The characters include various signs or symbols to form words, numbers or other sequences, particularly in the context of written language and numerical and/or mathematical expressions.

In step S2, the data representation module 13 determines a first visual representation of the visual object(s) based on the data entry. Specifically, the data representation module 13 determines a first visual representation of the graphical object(s), generated based on algorithms supported in the communication terminal 1, or a first visual representation of the characters, based on a font selected from the terminal fonts 15 supported by the communication terminal 1 or browser module, respectively. In case the user data entry defines one or more tables, the first visual representation of the table(s) is generated based on algorithms and/or graphical objects supported in the communication terminal 1. With the first visual representation of the entered characters, each entered character is represented with a character from the selected terminal font 15 that corresponds, one-to-one, to the entered character. Accordingly, the first visual representation is composed of characters from the selected terminal font 15 where each character in the first visual representation defines unambiguously the corresponding character entered by the user in step S1.

In step S3, the data representation module 13 shows in the display 10 of the communication terminal 1 the first visual representation of the visual objects, i.e. one or more graphical objects are rendered according to an algorithm supported in the communication terminal 1, or one or more characters are rendered in one of the terminal fonts 15 supported by the communication terminal 1 in one-to-one correspondence with the characters entered by the user. In case the user data entry defined one or more tables, the tables are rendered using algorithms and/or graphical objects supported in the communication terminal 1. The first visual representation of the visual object(s) is shown in a defined display area 11, e.g. a display area 11 controlled by the browser module.

For example, in FIG. 6, lines L1, L2, L3, and L4 show the visual representation of the character sequences "He", "Hel", "Hell", and "Hello", respectively, and lines L7, L8, L9, L10 and L11 show the visual representation of the character sequences "w" "wo", "wor", "worl", and "world", respectively, which are entered by the user and rendered on the display 10 in one of the terminal fonts 15, e.g. in the Arial font, as selected by the user and/or a software application program, e.g. the browser module. As can be seen in FIG. 6, each of the characters entered by the user is rendered in one-to-one correspondence with a character of the selected terminal font 15.

In an embodiment that includes execution of the optional steps SP0, SP1, SP2, SP3 of block SP, the data representation module 13 applies in step S3 the character metrics of the server font 30 which was received in optional step SP3 for the target font. This means that the individual characters are rendered in the display 10 of the communication terminal 1 in the selected terminal font 15, in each case in one-to-one correspondence with the respective character entered by the user, while the character metrics of the server font 30 are applied; particularly, the inter-character spacing associated with the server font 30 is applied to the characters rendered in the terminal font 15.

Figure 7:
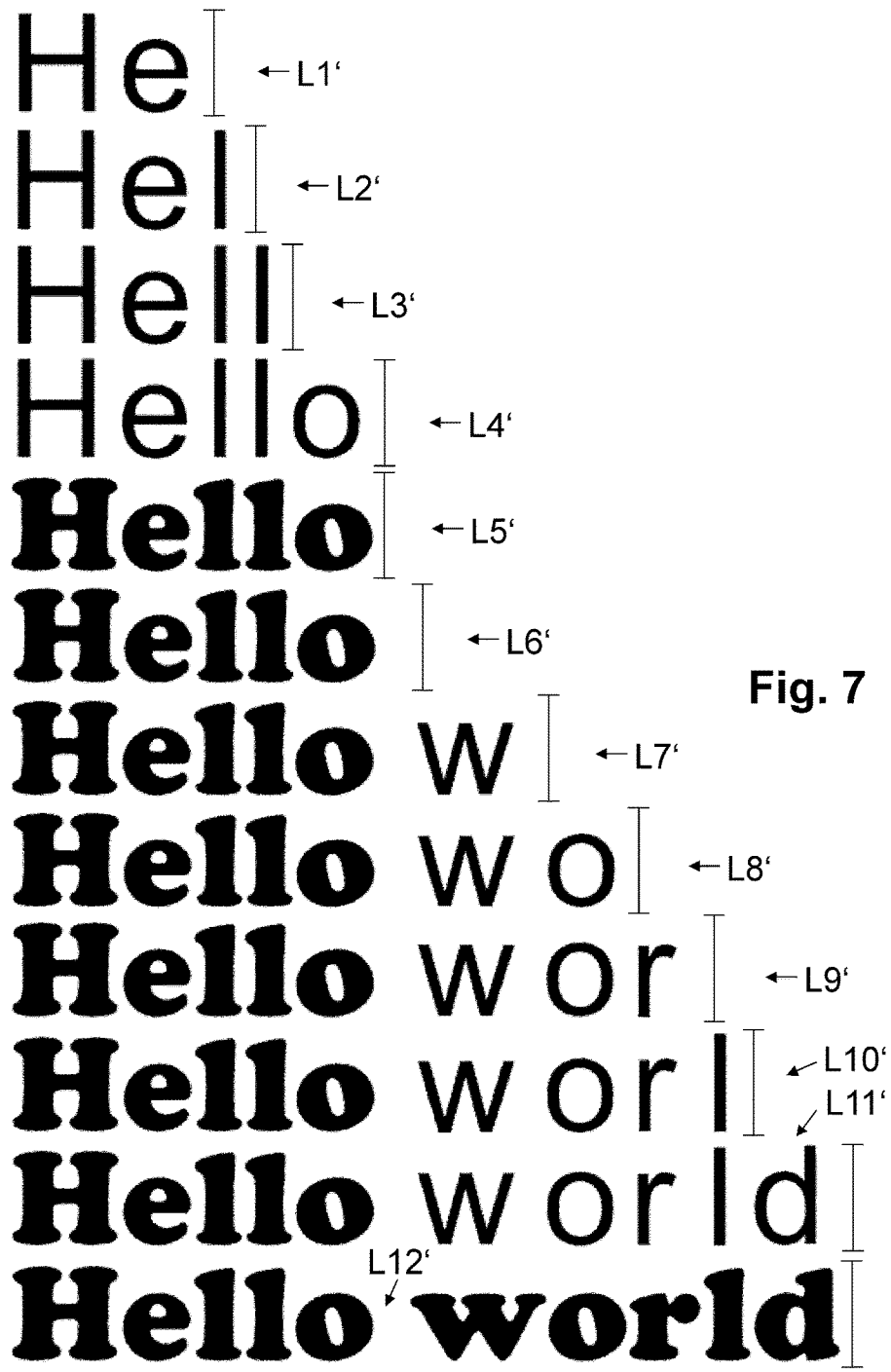
FIG. 7 shows an example of a sequential data entry corresponding to characters which are shown in a first visual representation with character metrics associated with a second visual representation, not supported locally in the communication terminal and, after a defined latency, replaced with the enhanced second visual representation.
Figure 8:
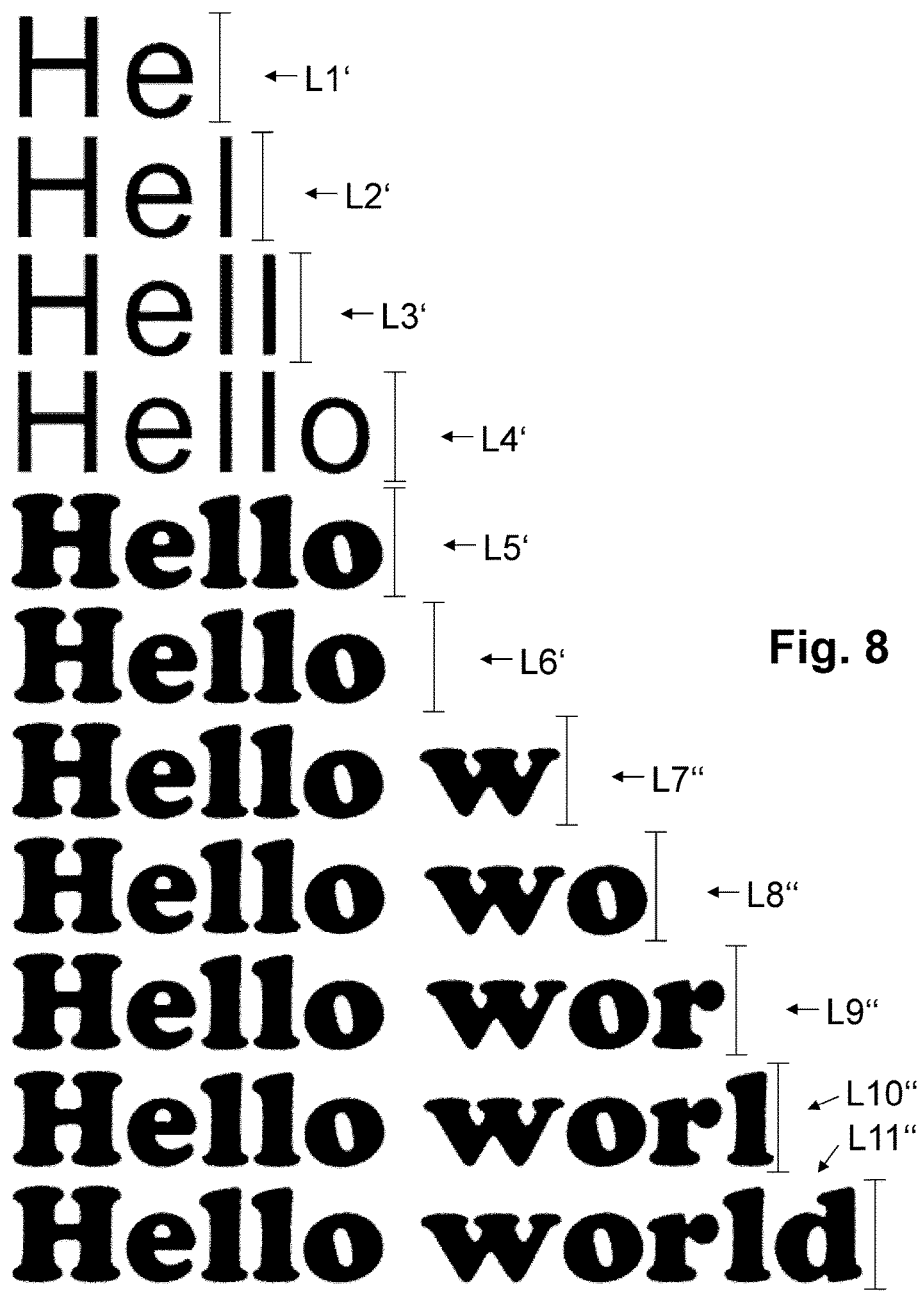
FIG. 8 shows another example of a sequential data entry corresponding to characters which are shown, up to a defined latency, in a first visual representation, supported locally in the communication terminal, and, after the defined latency, in the enhanced second visual representation, not supported locally in the communication terminal.

For example, in FIGS. 7 and 8, lines L1', L2', L3', and L4' show the visual representation of the character sequences "He", "Hel", "Hell", and "Hello", respectively, and, in FIG. 7, lines L7', L8', L9', L10' and L11' show the visual representation of the character sequences "w" "wo", "wor", "worl", and "world", respectively, which are rendered in the display 10 in the terminal font 15 using inter-character spacing according to the character metrics of the target server font 30. If a set of enhanced visual representations of characters was also retrieved in the optional steps of block SP, the data representation module 13 checks the local cache memory 16 for received server fonts 30, and renders at least some of the characters in the target server font 30 stored in the local cache memory 16.

In step S4, the enhancement module 14 determines whether or not conditions, which are defined by latency parameters stored in the communication terminal 1 or browser module, respectively, have been met. For example, the latency parameters define a duration of time, i.e. a set time delay, a number of characters, and/or a certain character or command after which a request for an enhanced visual representation of the visual object(s) is transmitted from the communication terminal 1 to the processing center 3. If the latency conditions have been met, the enhancement module 14 continues processing in block SE; otherwise, processing continues in step S1 by the data entry module 12 receiving from the user further data entry instructions.

In the examples of FIGS. 6 and 7, the latency conditions were met after the words "Hello" or "world" had been entered in lines L4, L4' or L11, L11', respectively. Specifically, in different embodiments of these examples, the latency parameters define a duration of time, an entry of five characters, or an entry of a space character, for example.

Block SE comprises a set of steps S5, S6, S7, and S8 which are performed for retrieving from the remote processing center 3 an enhanced visual representation of the visual object(s).

In step S5, the enhancement module 14 transmits via the telecommunications network 2 to the processing center 3 a request for enhanced visual representation of the visual object(s). The enhancement request includes a data representation of the visual object(s). Specifically, the enhancement module 14 transmits to the processing center 3 vectors or other numerical representations of one or more graphical objects, or codes of one or more characters, e.g. ASCII (American Standard Code for Information Interchange), EBCDIC (Extended Binary Coded Decimal Interchange Code), or other character encodings. The character encodings define a one-to-one correspondence of characters between different fonts. Depending on the embodiment or application, the enhancement request further includes a target specification which defines the enhanced visual representation of the visual object(s), e.g. a target algorithm for an enhanced visual representation of graphical objects, defined by an identifier of a specific server algorithm, or a target font for an enhanced visual representation of characters, defined by an identifier of a specific server font 30. Alternatively, the target specification is determined and defined by the processing center 3 depending on a session or application context. In case the user data entry defined one or more tables, the enhancement request includes a data representation of the tables, and the target visual representation defines the enhanced visual representation of the tables, e.g. algorithms and/or graphical objects for an enhanced visual representation of the tables.

In step S6, based on the enhancement request received from the communication terminal, the processing center 3 generates an enhanced second visual representation of the visual object(s). Specifically, the processing center 3 generates an enhanced visual representation of the visual object(s) defined by the data representation and the optional target specification included in the enhancement request. Depending on the embodiment and/or application, the enhanced visual representation of characters is provided in the form of server bitmap fonts or server outline fonts, also called vector fonts. Bitmap fonts consist in each case of a series of image dots or pixels of a character, whereas the outline (or vector) fonts comprise vectors, Bézier curves, drawing instructions and/or mathematical formulas to describe each character. In a preferred embodiment, the processing center 3 further determines a set of enhanced visual representations for the target specification, specifically, a set or subset of server fonts 30 and/or a set of graphical algorithms and/or graphical objects, e.g. for tables, matching in each case the target specification.

Figure 4:
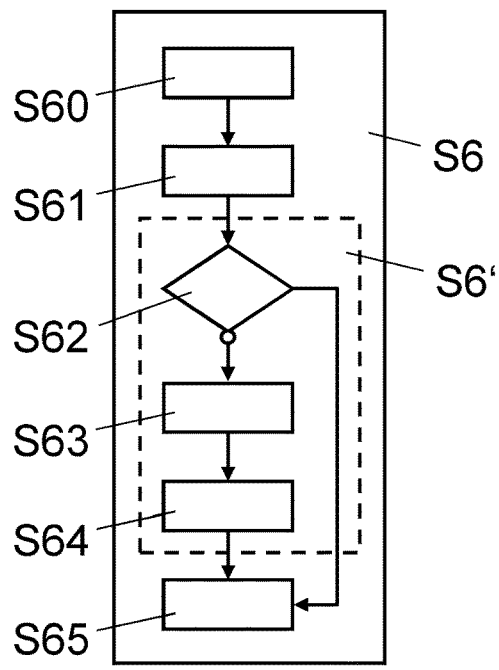
FIG. 4 shows a flow diagram illustrating schematically an exemplary sequence of steps performed at the remote processing center for generating enhanced representations of two-dimensional visual objects.

As illustrated in FIG. 4, step S6 includes a set of steps S60, S61, S62, S63, S64, and S65 for generating the enhanced visual representation.

In step S60, the receiver module 31 receives the enhancement request from the communication terminal 1 and extracts the data representation of the visual object(s), i.e. the numerical representation of the graphical object(s), e.g. for table(s), and/or the code(s) of the character(s), and the optional target specification, i.e. the target algorithm for the enhanced visual representation of the graphical object(s), e.g. for table(s), and/or the target font for the enhanced visual representation of the character(s).

In step S61, the generator module 33 determines, from the set of available server algorithms, the target algorithm for the enhanced visual representation of the graphical object(s), e.g. for table(s), and/or, from the server fonts 30, the target font for the enhanced visual representation of the character(s) based on the target specification included in the enhancement request, or depending on the context of a current session or application involving the communication terminal 1 and/or the processing center 3, respectively.

In step S62, the generator module 33 checks in its local cache memory 35 whether there is a stored copy of an enhanced visual representation of the visual object(s) that relates to the respective data representation of the visual objects and the respective target algorithm and/or target font. Specifically, the generator module 33 checks whether there is a stored image of graphical object(s), e.g. for table(s), matching the numerical representation and target algorithm, or a visual representation of character(s) matching the character code(s) and target font needed for performing and responding to the enhancement request. If there is not a matching enhanced visual representation in the cache memory 35, the generator module 33 continues processing in step S63; otherwise, processing continues in step S65 using the cached copy.

In step S63, based on the data representation of the visual objects and the target algorithm and/or target font, the generator module 33 generates the enhanced visual representation of the visual object(s). Specifically, the generator module 33 generates for the numerical representation of the graphical object(s) an image, e.g. a bitmap, of the graphical object(s) as produced by the target algorithm, e.g. for table(s), or determines for the code(s) of the character(s) a target bitmap font or target outline font (i.e. vector font). In an embodiment, the generator module 33 generates in any case an image of the character(s) in the target font, i.e. even if the target font is defined in the processing center 3 as an outline or vector font.

In step S64, the generator module 33 stores in the local cache memory 35 a copy of the enhanced visual representation of the visual object(s) assigned to the respective data representation of the visual object(s) and the respective target algorithm and/or target font. Specifically, the generator module 33 stores an image of the graphical object(s), or an image, a bitmap font or an outline font (i.e. vector font) of the character(s), in each case assigned to the respective numerical representation and target algorithm or to the respective character code(s) and target font, respectively.

In a preferred embodiment, the generator module 33 determines in block S6' a set of enhanced visual representations for the target specification, specifically, at least a subset of the server fonts 30 matching the target font, e.g. a set of server bitmap fonts or server outline fonts (vector fonts). For example, for European alphabets, e.g. the Latin or Cyrillic alphabets, this set of enhanced server fonts may be big enough to comprise the complete alphabet and additional special characters, whereas for Asian alphabets, e.g. the Chinese or Japanese alphabets, the set of enhanced server fonts may include only a subset of the respective alphabet. Preferably, the set of enhanced visual representations of characters also includes the character metrics data. In a variant, the set of enhanced visual representations for the target specification also includes target/server algorithms for rendering graphical object(s). In an embodiment, for retrieving a set of enhanced visual representations, only the target specification is included in the enhancement request.

In step S65, the transmitter module 32 generates an enhancement response which includes the enhanced visual representation of the visual object(s) as generated or determined in step S63 or S62, respectively, e.g. the image of graphical object(s) according to the target/server algorithm and/or the character(s) in the target/server font. Depending on the embodiment and application, the enhancement response further includes character metrics data associated with the target/server font and/or cursor positioning information. Moreover, in the preferred embodiment, the enhancement response also includes the set of enhanced visual representations for the target specification, as determined in block S6', specifically, a set or subset of the server fonts 30 matching the target font and/or a set or subset of target/server algorithms for rendering graphical object(s).

In step S7, the enhancement response is transmitted by the transmitter module 32 via the telecommunications network 2 to the communication terminal 1.

In step S8, the enhancement module 14 extracts the enhanced visual representation of the visual object(s) from the enhancement response received in step S7. Specifically, the enhancement module 14 extracts the image of graphical object(s) according to the target/server algorithm and/or the character(s) in the target/server font. Moreover, in the preferred embodiment, the enhancement module 14 extracts the set of enhanced visual representations for the target specification, specifically, the set or subset of the server fonts 30 matching the target font and/or the a set or subset of target/server algorithms for rendering graphical object(s), and stores this set or subset in the local cache memory 16.

In step S9, the enhancement module 14 replaces in the display area 11 the first visual representation of the visual object(s) with the enhanced visual representation of the visual object(s). Specifically, the graphical object(s) rendered according to the algorithm supported in the communication terminal 1 is overwritten with the image of the graphical object(s) rendered according to the target/server algorithm, and/or the character(s) rendered in one of the terminal fonts 15 is/are overwritten with character(s) rendered in the target/server font. In the example of tables, the first visual representation of the tables is overwritten in the display area 11 with the target visual representation of the tables.

For example, lines L5 and L5' in FIGS. 6, 7, and 8, or lines 12 and L12' in FIGS. 6 and 7, respectively, show the enhanced visual representation of the character sequences "Hello" or "world", respectively, after the initial rendering of these character sequences in one of the terminal fonts 15 has been replaced by the corresponding character sequences in the selected server font 30. As can be seen in FIGS. 6 and 7, in the transitions from the initial rendering on lines L4, L11 or L4', L11', respectively, to the enhanced visual representation on lines L5, L12 or L5', L12', respectively, the cursor is moved in each case by the enhancement module 14 to a position that enables continuation of data entry by the user; specifically, in the present example, the cursor is positioned behind character sequence with the enhanced visual representation. Thus, after replacement of the characters in the terminal font 15, the cursor is positioned in any case based on character metrics data associated with the server font 30, or cursor positioning information included in the enhancement response.

After placing the enhanced visual representation and positioning of the cursor, processing continues by receiving further data entry instructions from the user, either in step S1 or, in the preferred embodiment, in step S1', as illustrated in FIG. 3.

Depending on the embodiment, the data representation module 13 continues to apply the character metrics data associated with the terminal font 15 when the entered characters are rendered initially in the terminal font, as illustrated in FIG. 6 on lines L7, L8, L9, L10 and L11 for the character sequences "w" "wo", "wor", "worl", and "world", respectively; or the data representation module 13 applies the character metrics data associated with the server font 30, retrieved in optional block SP and/or received with the enhancement response, as illustrated in FIGS. 7 and 8 on lines L7', L8', L9', L10' and L11' for the character sequences "w" "wo", "wor", "worl", and "world", respectively.

In step S2', the data representation module 13 checks in the local cache memory 16 the set of enhanced visual representations for the target specification as received from the server 30. Specifically, the data representation module 13 checks whether in the local cache memory 16 an enhanced visual representation is available for the visual object(s) defined by the data entry of step S1', e.g. whether a target/server font is available for the respective character(s) and/or whether target/server algorithm is available for the respective geometrical object(s). If an enhanced visual representation is available, processing continues in step S3', otherwise an enhanced visual representation of the visual object(s) is retrieved from the remote processing center 3 in block SE, either immediately or after the defined latency.

In step S3', the data representation module 13 determines from the local cache memory 16 the enhanced visual representation of the visual object(s) based on the data entry of step S1'. Specifically, the graphical object(s) is/are rendered according to the target/server algorithm stored in the local cache memory 16, and/or the character(s) is/are rendered in the target/server font from the local cache memory 16. Subsequently, processing continues by receiving in step S1' further data entry instructions from the user.

For example, lines L7", L8", L9", L10", and L11" in FIG. 8, show the enhanced visual representation of the individual character entries "w", "o", "r", "l", and "d", immediately upon data entry with a target/server font from the local cache memory 16, without the need for an initial rendering of these characters in one of the terminal fonts 15.

Figure 5:
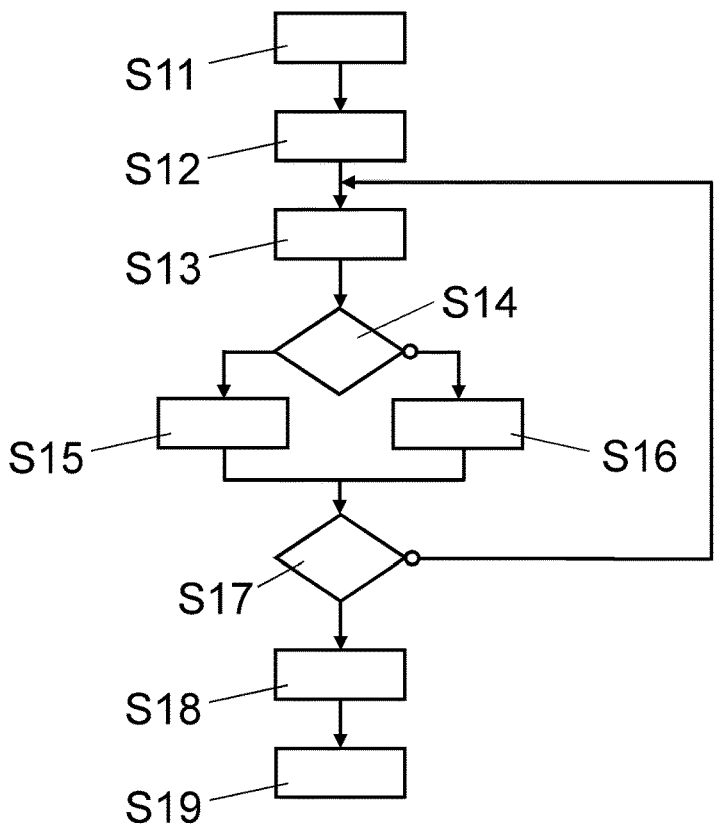
FIG. 5 shows a flow diagram illustrating schematically an exemplary sequence of steps performed at the communication terminal for editing enhanced representations of two-dimensional visual objects.
Figure 9:
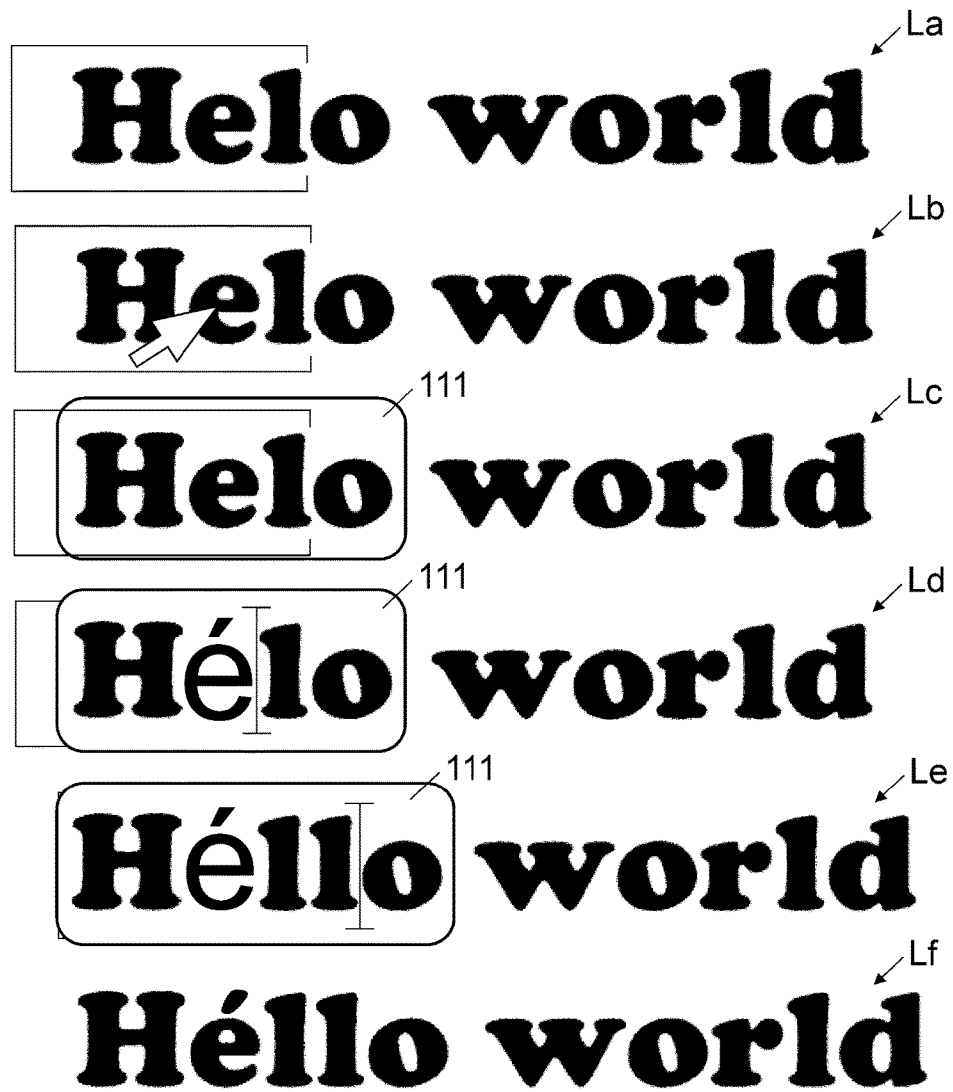
FIG. 9 shows an example of editing an enhanced visual representation of a string of characters which is not supported locally in the communication terminal.

In the following paragraphs, described with reference to FIGS. 5 and 9 are possible sequences of steps performed by the functional modules for editing a two-dimensional visual object which has already been displayed in the display area 11 in the enhanced visual representation, e.g. the character sequence "Helo" in line La of FIG. 9.

In step S11, the data entry module 12 receives from the user data entry instructions for editing the object in the enhanced visual representation. For example, a visual object in the enhanced representation is selected for editing by placing a pointer or a cursor over or onto the respective object, e.g. the character sequence "Helo" in server font, as shown in line Lb of FIG. 9, and by entering the editing mode through clicking, double-clicking or another activating command.

In step S12, responsive to the editing instruction, the data representation module 13 displays an optional editing window 111 which replaces or marks the enhanced visual representation, as illustrated in line Lc of FIG. 9.

In step S13, the data entry module 12 receives from the user data entry instructions for editing in the editing window 111 the visual object(s). For example, in the editing window 111, the character "e" is replaced with the character "é" to change the character sequence from "Helo" to "Hélo", as shown in line Ld of FIG. 9, and, subsequently, a second "l" is entered by the user to change the character sequence from "Hélo" to "Héllo", as shown in line Le of FIG. 9.

In step S14, the data representation module 13 checks in the local cache memory 16 whether an enhanced visual representation is available for added visual object(s) defined by the data entry instructions, e.g. whether a target/server font is available for the entered characters "é" or "l" in the example of FIG. 9. If an enhanced visual representation is available, processing continues in step S15, otherwise in step S16.

In step S15, the data representation module 13 determines from the local cache memory 16 the enhanced visual representation of the visual object(s) based on the data entry. For example, the entered character "l" is rendered in the enhanced target/server font from the local cache memory 16, as shown in line Le of FIG. 9.

In step S16, however, the data representation module 13 determines the first non-enhanced visual representation of the visual object(s) based on the data entry. For example, the entered character "é" is rendered in one of the terminal fonts 15 supported by the communication terminal 1, as shown in line Ld of FIG. 9, because this special character "é" is at that time not yet available as an enhanced target/server font from the local cache memory 16, but only supported as an initial terminal font 15.

In step S17, the data entry module 12 checks whether instructions were received from the user to leave the editing mode. For example, the editing mode is ended by way of entering a completion or cancellation command or by simply moving the pointer or cursor to change the focus to another object, outside the editing window. If the editing mode is ended, processing continues in step S18; otherwise, the editing mode is continued in step S13.

In step S18, the enhancement module 14 retrieves from the remote processing center 3 an enhanced visual representation of the visual object(s) edited in the editing window 111 which could not be rendered in an enhanced visual representation. Consequently, in step S18, performed is the set of steps S5, S6, S7, and S8 of block SE as described above with reference to FIG. 3.

In step S19, the enhancement module 14 replaces in the display area 11 the editing window 111 with the enhanced visual representation of the visual object(s) retrieved in step S18. Specifically, the graphical object(s) rendered and edited according to the algorithm supported in the communication terminal 1 is overwritten with the image of the edited graphical object(s) according to the target/server algorithm, and/or the character(s) rendered and edited in one of the terminal fonts 15 is overwritten by the edited character(s) in the target/server font 30.

For example, the editing window 111 which includes the character sequence "Héllo" in terminal font 15 is replaced by the character sequence "Héllo" in a server font 30, as shown in line Lf of FIG. 9.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

What is claimed is:

1. A method of providing one or more two-dimensional visual objects in a communication terminal, the method comprising:
    receiving in the communication terminal a data entry defining the one or more two-dimensional visual objects, said data entry entered by a user of the communication terminal;
    determining a defined target visual representation of the one or more visual objects corresponding to the data entry;
    retrieving character metrics data for the target visual representation from a server;
    determining in the communication terminal, from visual representations of visual objects supported by the communication terminal, that the target visual representation of the one or more visual objects is not supported by the communication terminal;
    generating in the communication terminal, from the visual representations of visual objects supported by the communication terminal, a first visual representation of the one or more visual objects, the first visual representation having a one-to-one correspondence to the data entry; and
    showing in a display area of the communication terminal the first visual representation of the one or more visual objects while applying the received character metrics data for the target visual representation, the display area corresponding to the data entry;
    in response to determining that the target visual representation of the one or more visual objects is not supported by the communication terminal:
        transmitting a request for the target visual representation of the one or more visual objects via a network to the server;
        by the server, responding to the request by generating the target visual representation of the one or more visual objects from visual representations of visual objects supported by the server, and by transmitting the target visual representation to the communication terminal;
        receiving in the communication terminal from the server via the network the target visual representation of the one or more visual objects; and
    overwriting in the display area the first visual representation of the one or more visual objects with the target visual representation of the one or more visual objects.

2. The method of claim 1, wherein the data entry defines one or more graphical objects; and the method further comprises
    determining the defined target visual representation of the one or more graphical objects;
    showing in the display area of the communication terminal a first visual representation of the one or more graphical objects, the first visual representation being based on an algorithm supported by the communication terminal;

transmitting from the communication terminal a data representation of the one or more graphical objects via the network to the server;

receiving in the communication terminal from the server via the network the target visual representation of the one or more graphical objects based on the data representation and an algorithm supported by the server; and overwriting in the display area the first visual representation of the one or more graphical objects with the target visual representation of the one or more graphical objects.

3. The method of claim 1, wherein the data entry defines one or more graphical objects, said one or more graphical objects including at least one of: a line, a square, a rectangle, and a polygon; and the method further comprises:

determining the defined target visual representation of the one or more graphical objects;

showing in the display area of the communication terminal a first visual representation of the one or more graphical objects, the first visual representation of the one or more graphical objects being supported by the communication terminal;

transmitting from the communication terminal a data representation of the one or more graphical objects via the network to the server;

receiving in the communication terminal from the server via the network the target visual representation of the one or more graphical objects from visual representations of the graphical objects supported by the server and based on the data representation of the one or more graphical objects; and overwriting in the display area the first visual representation of the one or more graphical objects with the target visual representation of the one or more graphical objects.

4. The method of claim 1, wherein the data entry defines one or more tables for arranging data in rows and columns; and the method further comprises:

determining the defined target visual representation of the one or more tables;

showing in the display area of the communication terminal a first visual representation of the one or more tables, the first visual representation being based on an algorithm supported by the communication terminal;

transmitting from the communication terminal a data representation of the one or more tables via the network to the server;

receiving in the communication terminal from the server via the network the target visual representation of the one or more tables based on the data representation of the one or more tables and based on an algorithm supported by the server; and overwriting in the display area the first visual representation of the one or more tables with the target visual representation of the one or more tables.

5. The method of claim 1, wherein the data entry defines one or more tables for arranging data in rows and columns; and the method further comprises:

determining the defined target visual representation of the one or more tables;

showing in the display area of the communication terminal a first visual representation of the one or more tables, the first visual representation of the one or more tables being supported by the communication terminal;

transmitting from the communication terminal a data representation of the one or more tables via the network to the server;

receiving in the communication terminal from the server via the network the target visual representation of the one or more tables from visual representations supported by the server and based on the data representation of the one or more tables; and overwriting in the display area the first visual representation of the one or more tables with the target visual representation of the one or more tables.

6. The method of claim 1, further comprising: defining latency parameters in the communication terminal; and transmitting a data representation of the one or more visual objects from the communication terminal to the server according to the latency parameters.

7. The method of claim 1, wherein the data entry defines a plurality of visual objects.

8. A communication terminal, comprising one or more processors or hardware modules configured to implement functional modules, the functional modules including:

a data entry module configured to receive a data entry defining one or more two-dimensional visual objects, said data entry entered by a user of the communication terminal;

a data representation module configured (a) to determine a defined target visual representation of the one or more visual objects corresponding to the data entry, (b) to determine, from visual representations of visual objects supported by the communication terminal, that the target visual representation of visual objects is not supported by the communication terminal, (c) to determine, from the visual representations of visual objects supported by the communication terminal, a first visual representation of the one or more visual objects with a one-to-one correspondence to the data entry, and (d) to show in a display area corresponding to the data entry the first visual representation of the one or more visual objects; and an enhancement module configured to, in response to the determination that the target visual representation of visual objects is not supported by the communication terminal, transmit a data representation of the visual objects via a network to a processing system, to receive from the processing system via the network the target visual representation of the one or more visual objects, the target visual representation of the one or more visual objects generated by the processing system from visual representations of visual objects supported by the processing system and based on the data representation of the one or more visual objects, and to overwrite in the display area the first visual representation of the one or more visual objects with the target visual representation of the one or more visual objects;

wherein the enhancement module is additionally configured to retrieve character metrics data for the target visual representation from the processing system, and wherein the data representation module is configured to apply the character metrics data when showing the first visual representation of the one or more visual objects in the display area.

9. The communication terminal of claim 8, wherein:

the data entry module is configured to receive a data entry defining one or more graphical objects;

the data representation module is configured to determine the defined target visual representation of the one or more graphical objects, and to show in the display area a first visual representation of the one or more graphical objects, the first visual representation being based on an algorithm supported by the communication terminal; and the enhancement module is configured to transmit a data representation of the one or more graphical objects via the network to the processing system, to receive from the processing system via the network the target visual representation of the one or more graphical objects based on the data representation of the one or more graphical objects and based on an algorithm supported by the processing system, and to overwrite in the display area the first visual representation of the one or more graphical objects with the target visual representation of the one or more graphical objects.

10. The communication terminal of claim 8, wherein:

the data entry module is configured to receive a data entry defining one or more graphical objects, said one or more graphical objects including at least one of: a line, a square, a rectangle, and a polygon;

the data representation module is configured to determine the defined target visual representation of the one or more graphical objects, and to show in the display area a first visual representation of the one or more graphical objects, the first visual representation of the one or more graphical objects being supported by the communication terminal; and the enhancement module is configured to transmit a data representation of the one or more graphical objects via the network to the processing system, to receive from the processing system via the network the target visual representation of the one or more graphical objects from visual representations of the graphical objects supported by the processing system and based on the data representation of the one or more graphical objects, and to overwrite in the display area the first visual representation of the one or more graphical objects with the target visual representation of the one or more graphical objects.

11. The communication terminal of claim 8, wherein:

the data entry module is configured to receive a data entry defining one or more tables for arranging data in rows and columns;

the data representation module is configured to determine the defined target visual representation of the one or more tables, and to show in the display area of the communication terminal a first visual representation of the one or more tables, the first visual representation being based on an algorithm supported by the communication terminal; and the enhancement module is configured to transmit a data representation of the one or more tables via the network to the processing system, to receive from the processing system via the network the target visual representation of the one or more tables based on the data representation of the one or more tables and based on an algorithm supported by the processing system, and to overwrite in the display area the first visual representation of the one or more tables with the target visual representation of the one or more tables.

12. The communication terminal of claim 8, wherein:

the data entry module is configured to receive a data entry defining one or more tables for arranging data in rows and columns;

the data representation module is configured to determine the defined target visual representation of the one or more tables, and to show in the display area of the communication terminal a first visual representation of the one or more tables, the first visual representation supported by the communication terminal; and the enhancement module is configured to transmit a data representation of the one or more tables via the network to the processing system, to receive from the processing system via the network the target visual representation of the one or more tables from visual representations of the tables supported by the processing system and based on the data representation of the one or more tables, and to overwrite in the display area the first visual representation of the one or more tables with the target visual representation of the one or more tables.

13. The communication terminal of claim 8, wherein the communication terminal has stored therein latency parameters; and the enhancement module is configured to transmit the data representation to the processing system according to the latency parameters.

14. A computer program product comprising a non-transitory, tangible computer-readable medium with computer program code for controlling one or more processors of a communication terminal such that the communication terminal, in response to receiving a data entry entered by a user defining one or more two-dimensional visual objects, at least:

determines a defined target visual representation of the one or more visual objects corresponding to the data entry;

determines that the target visual representation of the one or more visual objects is not supported by the communication terminal;

retrieves character metrics data for the target visual representation of the one or more visual objects from a server;

determines, from visual representations of visual objects supported by the communication terminal, a first visual representation of the one or more visual objects with a one-to-one correspondence to the data entry;

shows in a display area corresponding to the data entry the first visual representation of the one or more visual objects while applying the character metrics data for the target visual representation; and in response to determining that the target visual representation of the one or more visual objects is not supported by the communication terminal:

transmits a data representation of the one or more visual objects via a network to the processing system;

transmits a request for the target visual representation of the one or more visual objects via the network to the processing system;

receives from the processing system via the network the target visual representation of the one or more visual objects, said target visual representation generated by the processing system, in response to the request, from visual representations of visual objects supported by the processing system; and overwrites in the display area the first visual representation of the one or more visual objects with the target visual representation of the one or more visual objects.

15. The computer program product of claim 14, further comprising computer program code configured to control the one or more processors such that the communication terminal, in response to receiving the data entry defining one or more graphical objects, at least:

determines the defined target visual representation of the one or more graphical objects;

shows in the display area a first visual representation of the one or more graphical objects, the first visual representation being based on an algorithm supported by the communication terminal;

transmits a data representation of the one or more graphical objects via the network to the processing system;

receives from the processing system via the network the target visual representation of the one or more graphical objects; and overwrites in the display area the first visual representation of the one or more graphical objects with the target visual representation of the one or more graphical objects.

16. The computer program product of claim 14, further comprising computer program code configured to control the one or more processors such that the communication terminal, in response to receiving the data entry defining one or more graphical objects, said one or more graphical objects including at least one of: a line, a square, a rectangle, and a polygon, at least:

determines the defined target visual representation of the one or more graphical objects;

shows in the display area a first visual representation of the one or more graphical objects, the first visual representation being supported by the communication terminal;

transmits a data representation of the one or more graphical objects via the network to the processing system;

receives from the processing system via the network the target visual representation of the one or more graphical objects from visual representations of the graphical objects supported by the processing system and based on the data representation of the one or more graphical objects; and overwrites in the display area the first visual representation of the one or more graphical objects with the target visual representation of the one or more graphical objects.

17. The computer program product of claim 14, further comprising computer program code configured to control the one or more processors such that the communication terminal, in response to receiving the data entry defining one or more tables for arranging data in rows and columns, at least:

determines the defined target visual representation of the one or more tables;

shows in the display area a first visual representation of the one or more tables, the first visual representation being based on an algorithm supported by the communication terminal;

transmits a data representation of the one or more tables via the network to the processing system;

receives from the processing system via the network the target visual representation of the one or more tables; and overwrites in the display area the first visual representation of the one or more tables with the target visual representation of the one or more tables.

18. The computer program product of claim 14, further comprising computer program code configured to control the one or more processors such that the communication terminal, in response to receiving the data entry defining one or more tables for arranging data in rows and columns, at least:

determines the defined target visual representation of the one or more tables;

shows in the display area a first visual representation of the one or more tables, the first visual representation being supported by the communication terminal;

transmits a data representation of the one or more tables via the network to the processing system;

receives from the processing system via the network the target visual representation of the one or more tables; and overwrites in the display area the first visual representation of the one or more tables with the target visual representation of the one or more tables.

* * * * *